(12) United States Patent
Quave

(10) Patent No.: US 9,770,962 B2
(45) Date of Patent: Sep. 26, 2017

(54) VEHICLE PASSENGER REMINDER SYSTEM

(71) Applicant: Susan Quave, Butler, TN (US)

(72) Inventor: Susan Quave, Butler, TN (US)

(*) Notice: Subject to any disclaimer, the term of this patent is extended or adjusted under 35 U.S.C. 154(b) by 0 days.

(21) Appl. No.: 14/813,876

(22) Filed: Jul. 30, 2015

(65) Prior Publication Data

US 2016/0042624 A1 Feb. 11, 2016

Related U.S. Application Data

(60) Provisional application No. 62/035,563, filed on Aug. 11, 2014.

(51) Int. Cl.
*G08B 21/02* (2006.01)
*B60H 1/00* (2006.01)
*B60N 2/00* (2006.01)
*G08B 21/24* (2006.01)

(52) U.S. Cl.
CPC ..... *B60H 1/00657* (2013.01); *B60H 1/00742* (2013.01); *B60H 1/00978* (2013.01); *B60N 2/002* (2013.01); *G08B 21/24* (2013.01)

(58) Field of Classification Search
CPC .... G08B 21/02; G08B 21/24; B60H 1/00657; B60H 1/00878; B60H 1/00742; B60H 1/00978; B60N 2/002
USPC .. 340/500, 501, 505, 539.1, 539.15, 539.22, 340/539.27, 540, 573.1, 665, 666, 667, 340/692, 3.1, 5.1, 6.1
See application file for complete search history.

(56) References Cited

U.S. PATENT DOCUMENTS

| | | | |
|---|---|---|---|
| 5,626,386 A * | 5/1997 | Lush | A47C 7/74 297/180.13 |
| 6,812,844 B1 | 11/2004 | Burgess | |
| 6,922,147 B1 * | 7/2005 | Viksnins | B60N 2/002 180/272 |
| 6,998,988 B1 | 2/2006 | Kalce | |
| 7,123,157 B2 | 10/2006 | Best | |
| 7,378,979 B2 | 5/2008 | Rams, Jr. | |
| 7,714,737 B1 | 5/2010 | Morningstar | |
| 8,058,983 B1 * | 11/2011 | Davisson | G08B 21/0205 340/10.1 |
| 8,232,874 B1 | 7/2012 | Aneiros et al. | |
| 2010/0078978 A1 * | 4/2010 | Owens | B60N 2/002 297/250.1 |
| 2013/0300555 A1 * | 11/2013 | Sickon | B60R 22/48 340/457.1 |
| 2015/0274049 A1 * | 10/2015 | Langensiepen | B60N 2/5628 297/180.12 |

* cited by examiner

*Primary Examiner* — Brian Wilson
(74) *Attorney, Agent, or Firm* — Global Intellectual Property Agency, LLC; Daniel Boudwin

(57) ABSTRACT

A vehicle passenger reminder system for notifying a user that a passenger has been left unattended in a vehicle. The vehicle passenger reminder system includes a driver weight sensor to be positioned on the driver's seat to determine if the driver is seated in the vehicle. The system further includes a child weight sensor for a child seat to determine if a child is seated in a vehicle. When the driver exits the vehicle, a control unit of the present invention determines if the child is still seated in the vehicle, and an alarm system is activated to notify the user. Further, a cooling mechanism is provided that includes a fan for cooling the child if a temperature sensor detects that the temperature within the vehicle has risen to a predetermined temperature.

7 Claims, 3 Drawing Sheets

VEHICLE PASSENGER REMINDER SYSTEM

CROSS REFERENCE TO RELATED APPLICATION

This application claims the benefit of U.S. Provisional Application No. 62/035,563 filed on Aug. 11, 2014. The above identified patent application is herein incorporated by reference in its entirety to provide continuity of disclosure.

BACKGROUND OF THE INVENTION

Field of the Invention

The present invention relates to a vehicle passenger reminder system. More specifically, the present invention provides a vehicle passenger reminder system comprising a driver weight sensor positioned on the driver's seat and a child weight sensor positioned under a child's car seat, wherein an alarm system is activated if the driver is not detected while a child passenger is detected. Further, the device includes a temperature sensor and cooling mechanism for cooling the passenger in the event that the temperature reaches a predetermined level.

Even attentive parents may leave their child in the rear seat of a vehicle while performing errands or making other stops. The parent may leave the child in the vehicle intentionally and may fail to return to the vehicle as quickly as anticipated due to delays and absent-mindedness. On other occasions, such as when the guardian is in a hurry, the guardian may simply forget that the child is in the vehicle.

Leaving a child unattended in a vehicle can be dangerous for the child. Temperatures inside of the vehicle can escalate rapidly in periods of warm weather causing heat related injuries. Further, during the winter, the interior of the vehicle may be too cold and the child's health may be negatively affected. Thus, a device for alerting a person that their child is in the car or that the person has forgotten their child in the vehicle is provided.

Description of the Prior Art

Devices have been disclosed in the prior art that relate to vehicle passenger detection and notification systems. These include devices that have been patented and published in patent application publications. Devices in the prior art generally relate to child alert systems having a sensor such as a seatbelt alarm or pressure pad for detecting if a child is in a vehicle. Further, such devices include alarm units for notifying the driver when the child has been left in the vehicle. Some such devices include U.S. Pat. No. 8,232,874, U.S. Pat. No. 6,812,844, U.S. Pat. No. 6,812,844, U.S. Pat. No. 7,714,737, U.S. Pat. No. 7,378,979, U.S. Pat. No. 7,123,157, and U.S. Pat. No. 6,998,988.

These prior art devices have several known drawbacks. Devices in the prior art disclose only an alarm system for notifying the driver that a child has been left in a vehicle. However, the user may still fail to hear the alarm and the child may still be left unattended. Thus, the present invention provides a temperature sensor for detecting the temperature within the vehicle, and a cooling mechanism for producing a more comfortable temperature inside of the vehicle to ensure that the child does not overheat and suffer heat related injuries.

In light of the devices disclosed in the prior art, it is submitted that the present invention substantially diverges in design elements from the prior art and consequently it is clear that there is a need in the art for an improvement to existing vehicle passenger reminder systems. In this regard the instant invention substantially fulfills these needs.

SUMMARY OF THE INVENTION

In view of the foregoing disadvantages inherent in the known types of vehicle passenger reminder systems now present in the prior art, the present invention provides a new vehicle passenger reminder system wherein the same can be utilized for providing convenience for the user when notifying the user that a child has been left in a vehicle.

It is therefore an object of the present invention to provide a new and improved vehicle passenger reminder system that has all of the advantages of the prior art and none of the disadvantages.

It is another object of the present invention to provide a vehicle passenger reminder system comprising a weight sensor to be placed on a driver's seat and a child weight sensor to be placed under a child car seat, wherein an alarm unit is activated if the driver is not detected while a passenger is detected.

Another object of the present invention is to provide a vehicle passenger reminder system comprising a temperature sensor and a cooling mechanism, wherein the cooling mechanism is activated if a predetermined temperature is reached.

Yet another object of the present invention is to provide a vehicle passenger reminder system having an alarm system that produces an audible alert if a passenger is left within a vehicle.

Another object of the present invention is to provide a vehicle passenger reminder system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
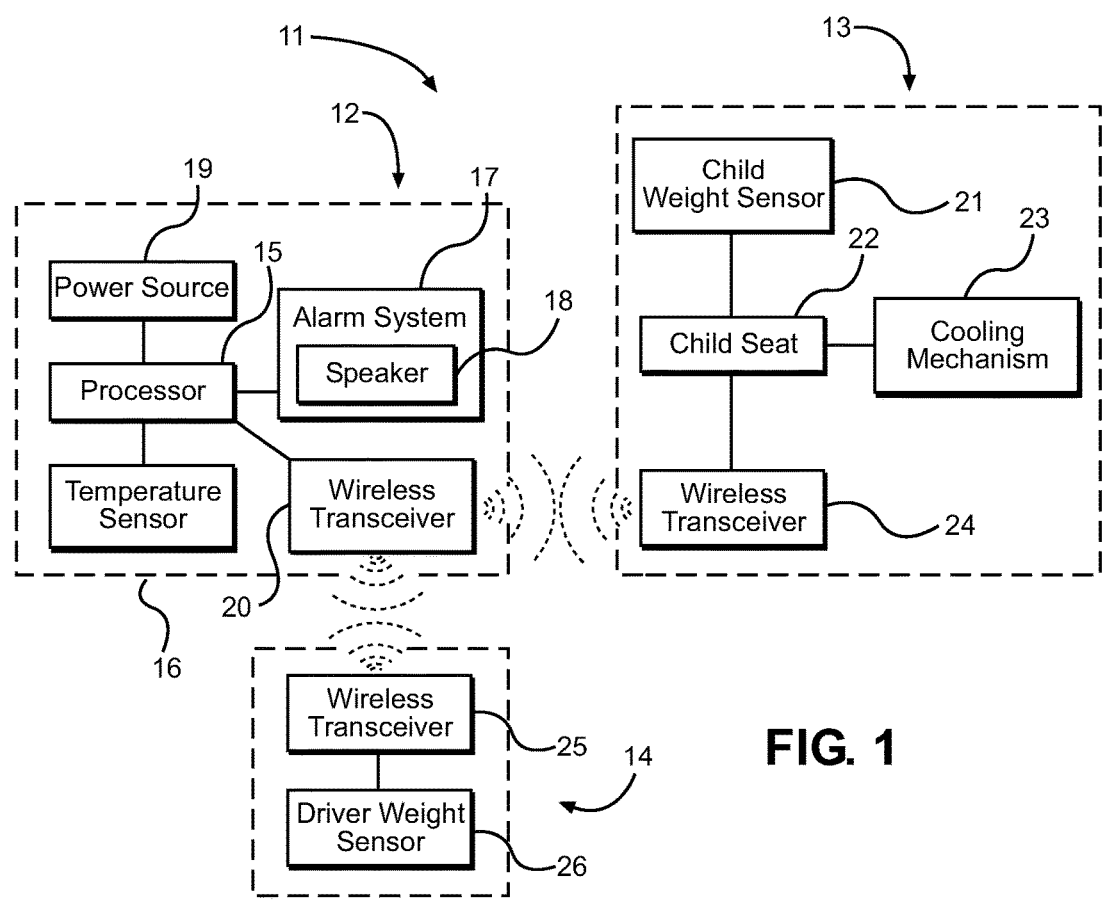
FIG. 1 shows a schematic diagram of the vehicle passenger reminder system of the present invention.

Reference is made herein to the attached drawings. Like reference numerals are used throughout the drawings to depict like or similar elements of the vehicle passenger reminder system. For the purposes of presenting a brief and clear description of the present invention, the preferred embodiment will be discussed as used for alerting the user that a child has been left unattended in a vehicle. The figures are intended for representative purposes only and should not be considered to be limiting in any respect.

Referring now to FIG. 1, there is shown a schematic diagram of the vehicle passenger reminder system of the present invention. The vehicle passenger reminder system 11 comprises a control unit 12, a child or passenger unit 13, and a driver unit 14. The control unit 12 is adapted to communicate with both the child unit 13 and the driver unit 14. The control unit 12 is preferably in wireless communication with the child unit and driver units 13, 14, but may alternatively be in wired or physical connection therewith. For example, the control unit 12 may be integrated with the driver unit 14.

The driver unit 14 comprises a weight sensor 26 that can be positioned on the surface of a vehicle's driver seat. Alternatively, the weight sensor 26 can be integrated into the surface of the vehicle driver seat for a more seamless appearance. The weight sensor 26 is adapted to detect whether a person is seated in the driver seat based upon the weight applied thereto. In other embodiments, the control unit 12 and driver unit 14 are separate units. The driver unit 14 includes a wireless transceiver 25 for sending and receiving signals to the wireless transceiver 20 of the control unit 12. The weight sensor 26 of the driver unit 14 communicates with the control unit 12 so as to indicate whether the driver is seated on the driver's seat.

The child unit 13 similarly comprises a child weight sensor 21 adapted to detect if a child is a passenger in the vehicle. The child weight sensor 21 can be disposed on the surface of the back seat of a vehicle, below a child seat or baby carrier 22. Alternatively, the weight sensor 21 can be integrated into the upper surface of the car seat or can be integrated into the baby seat or carrier 22. The child weight sensor 21 includes a wireless transceiver 24 for communicating with the wireless transceiver 20 of the control unit 12. The child weight sensor 21 is adapted to communicate whether the child is seated in the child seat 22 or carrier. The child unit 13 further includes a cooling mechanism 23 that can be activated when a temperature sensor 16 of the control unit 12 detects temperatures above a predetermined level.

The control unit 12 comprises a processor 15 and a power source 19 for controlling the operation of the vehicle passenger reminder system 11. The control unit 12 further includes an alarm system 17 having one or more speakers 18. The alarm system 17 is adapted to produce an audible alert when a child is seated in the child carrier but the driver is not seated in the driver seat. The alarm system 17 may produce a repeating tone or may sound similar to a car alarm. The control unit 12 includes a wireless transceiver 20 for communicating with both the child unit 13 and the driver unit 14.

Further, the control unit 12 or the child unit 13 includes a temperature sensor 16 for determining the temperature inside of the vehicle. If the temperature sensor 16 detects a temperature at or above a predetermined level, a cooling mechanism 23 on the child unit 13 is activated so as to cool the passenger and to keep the passenger at a comfortable temperature until the driver returns to the vehicle.

Figure 2:
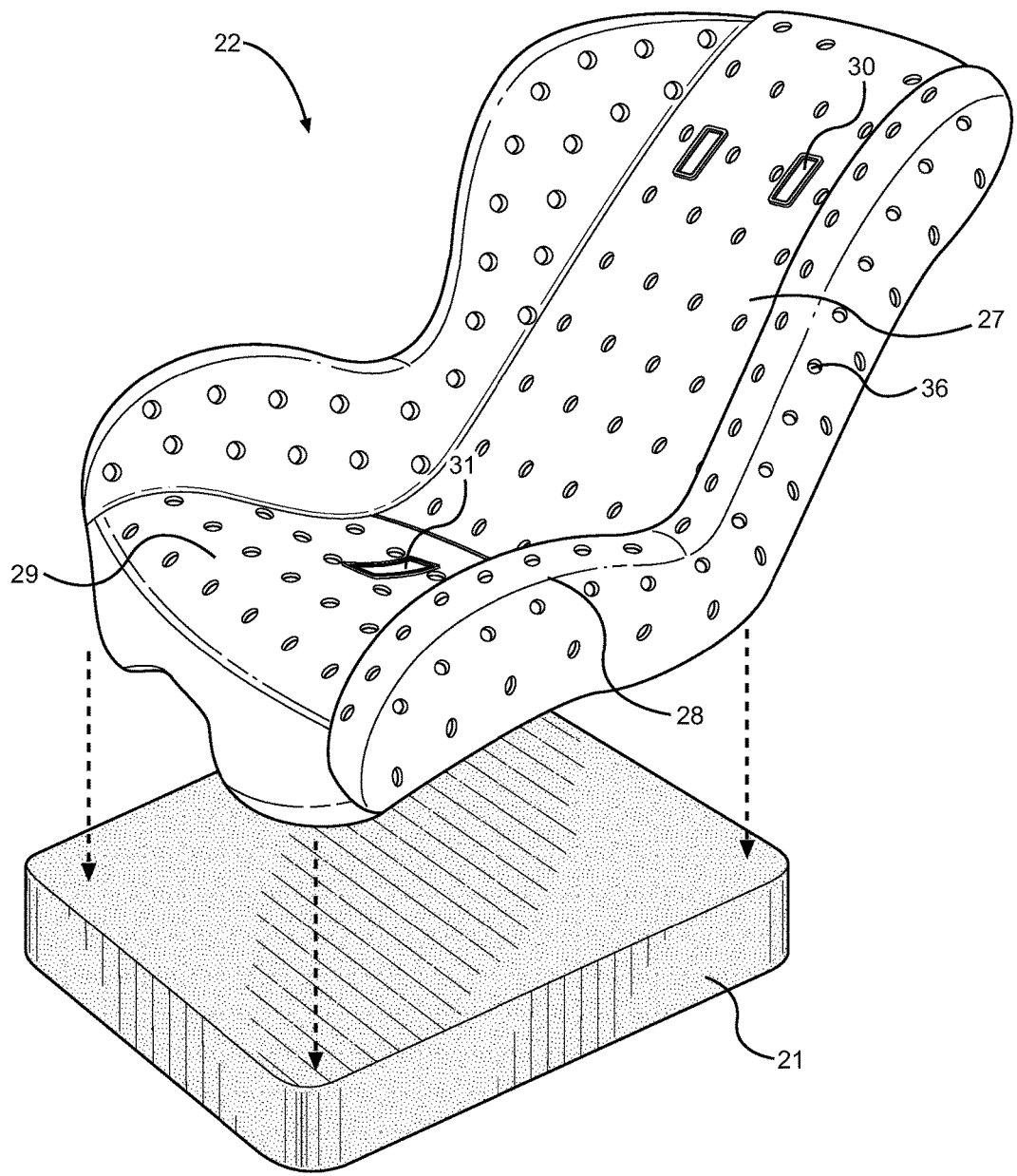
FIG. 2 shows a perspective view of the car seat of the present invention.

Referring now to FIG. 2, there is shown a perspective view of the car seat of the present invention. In some embodiments, the child unit comprises a child seat 22 having a seat section 29, a backrest section 27, and a pair of armrest sections 28. The child seat 22 may include a plurality of air holes 36 thereon through which air can flow. A cooling mechanism, such as a fan, may be integrated into the child seat 22 so as to provide air through the air holes 36 in order to cool the user. The child seat 22 further includes one or more apertures 31, 30 on the seat section 29 and backrest section 27 in order to allow a seatbelt to be passed therethrough.

Figure 3:
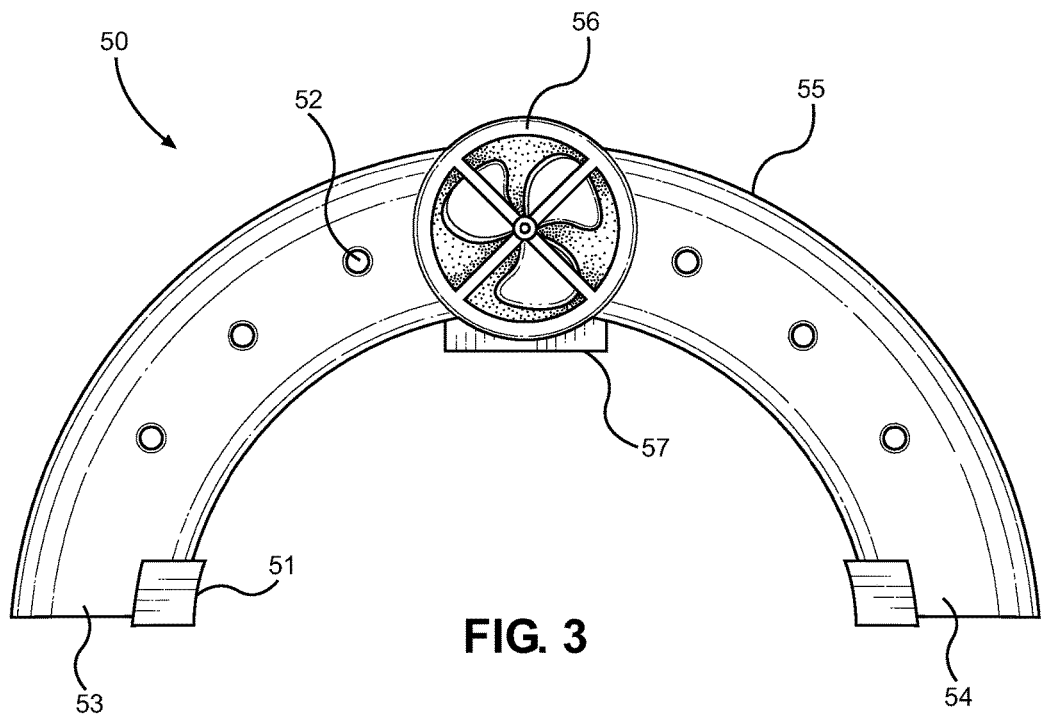
FIG. 3 shows a view of a cooling mechanism of the present invention.

Referring now to FIG. 3, there is shown a view of a cooling mechanism of the present invention. The cooling mechanism 50 comprises a rounded support 55 having a first end 53 and a second end 54. The cooling mechanism 50 comprises a centrally located cooling fan 56 thereon. Further, the cooling mechanism 50 can include a plurality of air holes 52 through which air can flow. The cooling mechanism 50 can be removably secured to a child seat or baby carrier via fasteners 51 thereon. The fasteners may include high-friction pads, or may include alternate types of fasteners suited to secure the cooling mechanism 50 to the child seat. The cooling mechanism 50 is positioned so that the fan thereon is directed towards the child seat. In some embodiments, the cooling mechanism 50 includes a temperature sensor 57 thereon for detecting the ambient temperature within a vehicle, and if the temperature is at or above a predetermined level, the cooling fan 56 will be activated.

Figure 4:
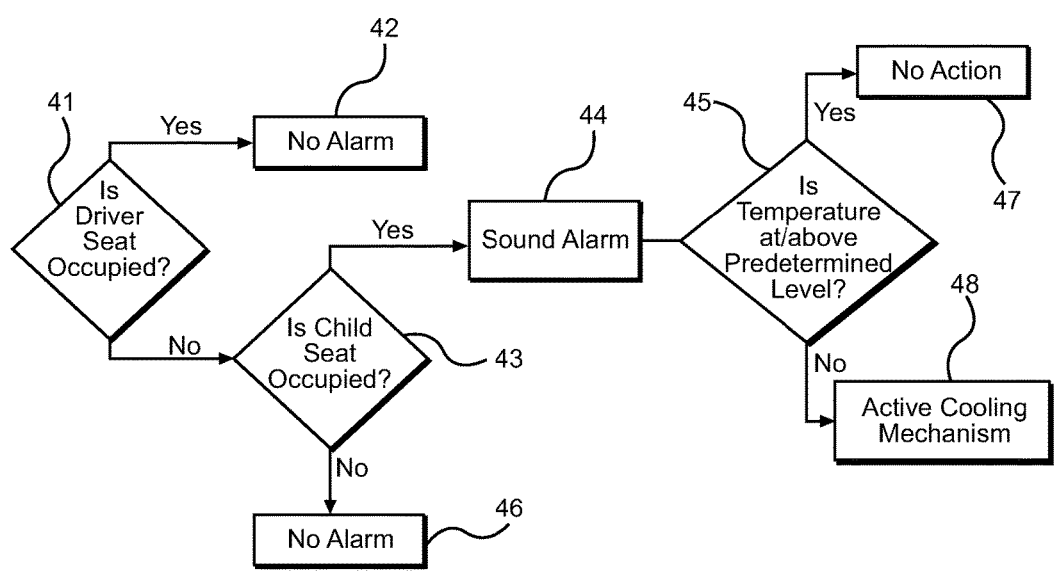
FIG. 4 shows a flow chart of the operation of the vehicle passenger reminder system.

Referring now to FIG. 4, there is shown a flow chart of the operation of the vehicle passenger reminder system. In operation, the weight sensor on the driver's seat will detect if the driver seat is occupied 41. If the driver seat is occupied, the alarm system will not produce an audible alert 42. If the driver seat is not occupied, the control unit will determine if the child seat is occupied 43. If the child seat is also not occupied, no alarm will sound 46, as this indicates that the driver did not leave the child in the vehicle. However, if the child seat is occupied, an alarm will sound 44 so as to notify the driver that he or she has left the child in the vehicle. The control unit may include a delay that provides the user with a preset amount of time to retrieve the child from the child seat before the alarm system begins to produce an audible alert.

If the child seat is occupied and the driver seat is not occupied, the control unit will also determine if the temperature has reached a predetermined level 45 that is unsafe for vehicle occupancy. If the temperature has exceeded the predetermined temperature, the cooling mechanism on the child unit will be activated 48 so as to help the child or passenger remain at a comfortable temperature. If the temperature is below the predetermined temperature, the cooling mechanism will remain inactive 47 until the temperature reaches or exceeds the predetermined temperature.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle passenger reminder system, comprising:

a control unit comprising a processor, a temperature sensor, and an alarm system, wherein said control unit is in communication with a driver unit and a child unit;

said driver unit comprising a driver weight sensor configured to determine if a driver is seated in a vehicle;

said child unit comprising a child weight sensor configured to determine if a child is seated in said vehicle;

wherein said alarm system is configured to produce an audible alert if said driver weight sensor does not detect said driver and said child weight sensor detects said child;

the child unit comprises a cooling mechanism removably securable to a child seat;

the child seat comprises a seat section, a backrest section, and a pair of armrests;

the child seat includes a plurality of holes in fluid communication with the cooling mechanism, wherein the plurality of holes are distributed at intervals along the child seat;

the plurality of holes form a grid comprising rows and columns;

wherein said control unit is configured to measure the temperature within said vehicle via said temperature sensor if both said driver weight sensor does not detect said driver and said child weight sensor detects said child; and wherein said control unit is configured to activate said cooling mechanism if said temperature sensor detects a temperature that is above a predetermined threshold temperature.

2. The vehicle passenger reminder system of claim 1, wherein said control unit further comprises a wireless transceiver; wherein said driver unit comprises a wireless transceiver configured to communicate with said wireless transceiver of said control unit.

3. The vehicle passenger reminder system of claim 1, wherein said control unit further comprises a wireless transceiver; wherein said child unit comprises a wireless transceiver configured to communicate with said wireless transceiver of said control unit.

4. The vehicle passenger reminder system of claim 1, wherein said alarm system includes one or more speakers and is configured to produce the audible alert.

5. The vehicle passenger reminder system of claim 1, wherein said cooling mechanism comprises a rounded support having a fan thereon.

6. The vehicle passenger reminder system of claim 5, wherein said rounded support comprises a plurality of air holes thereon.

7. The vehicle passenger reminder system of claim 1, wherein said child seat comprises said child weight sensor therein.

* * * * *